(12) United States Patent
Hernandez et al.

(10) Patent No.: US 9,097,425 B2
(45) Date of Patent: Aug. 4, 2015

(54) FUEL MIXING DEVICE FOR TURBINE ENGINE COMBUSTION CHAMBER COMPRISING IMPROVED AIR FEED MEANS

(75) Inventors: Didier Hippolyte Hernandez, Quiers (FR); Romain Nicolas Lunel, Montereau sur le Jard (FR)

(73) Assignee: SNECMA, Paris (FR)

( * ) Notice: Subject to any disclaimer, the term of this patent is extended or adjusted under 35 U.S.C. 154(b) by 672 days.

(21) Appl. No.: 13/503,737

(22) PCT Filed: Nov. 3, 2010

(86) PCT No.: PCT/EP2010/066753
§ 371 (c)(1),
(2), (4) Date: Apr. 24, 2012

(87) PCT Pub. No.: WO2011/054880
PCT Pub. Date: May 12, 2011

(65) Prior Publication Data
US 2012/0204567 A1    Aug. 16, 2012

(30) Foreign Application Priority Data
Nov. 5, 2009    (FR) ...................................... 09 57839

(51) Int. Cl.
*F02C 1/00* (2006.01)
*F23R 3/14* (2006.01)
*F23R 3/28* (2006.01)

(52) U.S. Cl.
CPC . *F23R 3/14* (2013.01); *F23R 3/286* (2013.01); *Y02T 50/675* (2013.01)

(58) Field of Classification Search
CPC ................................... F23R 3/14; F23R 3/286
USPC ....................................................... 60/737, 748
See application file for complete search history.

(56) References Cited

U.S. PATENT DOCUMENTS

| | | | | |
|---|---|---|---|---|
| 3,570,242 | A * | 3/1971 | Leonardi et al. ................ | 60/737 |
| 4,726,182 | A * | 2/1988 | Barbier et al. ............... | 60/39.23 |
| 4,754,600 | A * | 7/1988 | Barbier et al. ............... | 60/39.23 |
| 5,941,075 | A * | 8/1999 | Ansart et al. .................... | 60/748 |
| 6,389,815 | B1 * | 5/2002 | Hura et al. ....................... | 60/746 |
| 7,478,534 | B2 * | 1/2009 | Guezengar et al. ............ | 60/796 |
| 7,823,392 | B2 * | 11/2010 | Locatelli et al. ................ | 60/799 |

(Continued)

FOREIGN PATENT DOCUMENTS

| | | |
|---|---|---|
| FR | 2 903 171 | 1/2008 |
| FR | 2 908 867 | 5/2008 |
| FR | 2 925 146 | 6/2009 |

OTHER PUBLICATIONS

French Search Report Issued Mar. 26, 2010 in FR 09 57839 Filed Nov. 5, 2009.

(Continued)

*Primary Examiner* — Ehud Gartenberg
*Assistant Examiner* — Lorne Meade
(74) *Attorney, Agent, or Firm* — Oblon, McClelland, Maier & Neustadt, L.L.P.

(57) ABSTRACT

A fuel mixing device for an annular combustion chamber of a turbine engine, including a member for centering a turbine engine injector head, at least one air intake ring including blades allowing swirling of air, a bowl including an annular row of air intake orifices, an annular cavity communicating with the air intake orifices, and channels arranged through the blades to feed air to the annular cavity.

9 Claims, 2 Drawing Sheets

(56) References Cited

U.S. PATENT DOCUMENTS

| | | | |
|---|---|---|---|
| 8,281,597 B2 * | 10/2012 | Li et al. | 60/748 |
| 8,312,723 B2 * | 11/2012 | Pieussergues et al. | 60/737 |
| 8,590,312 B2 * | 11/2013 | Sandelis | 60/748 |
| 2008/0168773 A1 | 7/2008 | Sandelis | |
| 2008/0202122 A1 | 8/2008 | Guezengar et al. | |
| 2009/0151357 A1 | 6/2009 | Pieussergues et al. | |
| 2010/0162713 A1 * | 7/2010 | Li et al. | 60/748 |

OTHER PUBLICATIONS

International Search Report Issued Aug. 25, 2011 in PCT/EP10/66753 Filed Nov. 3, 2010.

* cited by examiner

FUEL MIXING DEVICE FOR TURBINE ENGINE COMBUSTION CHAMBER COMPRISING IMPROVED AIR FEED MEANS

TECHNICAL FIELD

The present invention relates to the field of air and fuel injection systems equipping the annular combustion chambers of turbine engines, such as aircraft turbine engines and more particularly aircraft turbojet or turboprop engines.

It particularly concerns air and fuel mixing devices, sometimes simply called <<mixers>>, of the type formed of a structure of revolution which comprises means for centering the head of a fuel injector on the axis of the device, and which delimits a space dedicated to the mixing of fuel injected by the injector with air entering this space via orifices of the device.

In the remainder hereof, the term <<injection system>> is applied to the assembly formed by an injector and a mixing device.

STATE OF THE PRIOR ART

FIG. 1 very schematically illustrates an injection system 10 comprising a fuel injector 12 and a mixing device 14 of known type equipping an end wall of a combustion chamber (not visible in FIG. 1).

More specifically the mixing device 14, from upstream to downstream in the general direction 16 of the flow of fuel within this device 14, comprises a member 18 for centering a head 20 of the injector 12, an air intake ring 22 and an annular wall 24 flared towards downstream, called a <<bowl>> in the remainder hereof.

The centering member 18 is formed of an annular part flared towards upstream sometimes called a <<sliding feed-through>>.

The air intake ring 22 comprises blades to impart a swirling movement to the air passing through this ring around a longitudinal axis 23 of the device 14. On this account, this ring 22 is commonly called a <<swirler>>.

The bowl 24 is designed to guide, at the outlet of the injection system 10, a mixture of air and fuel intended to ignite in the primary zone of the combustion chamber.

In well-known manner, the mixing device 14 comprises an annular indexing lug 26 engaged between two radial walls 28 secured to the bottom of the combustion chamber to ensure axial locking of the device 14, whilst allowing radial clearance of the latter.

The indexing lug 26 is connected to the bowl 24 via an annular wall 30 extending upstream from a radially outer part 32 of this bowl 24, which forms a heat shield collar.

The aforementioned annular wall 30 comprises a substantially cylindrical part of revolution 34 connected via its upstream end to the indexing lug 26, and a substantially radial part 36 whose radially inner end is connected to the bowl 24 and whose radially outer end is connected to the aforementioned cylindrical part of revolution 34.

The axial span of the cylindrical part 34 of the annular wall 30 determines the axial positioning of the indexing lug 26 in relation to the downstream end of the bowl 24, whilst the radial span of the radial part 36 of this annular wall 30 determines the radial positioning of its cylindrical part 34 relative to an annular deflector 38.

The radial part 36 of the aforementioned annular wall 30 further comprises an annular row of orifices 40 for the passing of a cooling air flow to cool the radially outer part 32 of the bowl 24.

In addition, the bowl 24 comprises an annular row of orifices 42 for air intake in the combustion chamber.

These air intake orifices 42 are fed with air via an annular cavity 44 which is delimited by the bowl 24, by the annular wall 30 connecting the said bowl to the indexing lug 26, and by the downstream side of the intake ring 22.

The annular cavity 44 has an annular air inlet opening 46 arranged between the air intake ring 22 and the aforementioned annular wall 30.

In the mixing devices of the above-described type, the annular opening 46 of the cavity 44 must be sufficiently large to allow feeding of the air intake orifices 42 of the bowl 24 and the feeding of the air intake orifices 40 of the radial part 36 of the annular wall 30, at sufficient rate of air flow to allow good functioning of the combustion chamber.

Yet, it is sometimes desirable to reduce the axial volume and/or radial volume of the mixing devices, and in particular to reduce the axial span of the bowl so as to bring the outlet of these devices closer to the injector head 20 carried by these devices.

However, for a device of the above-described type, this translates as a reduction in the air inlet opening of the annular cavity feeding the air intake orifices of the bowl, which would induce an unacceptable reduction in the air flow feeding these orifices.

DISCLOSURE OF THE INVENTION

It is a particular objective of the invention to provide a simple, economic and efficient solution to this problem.

The subject of the invention is fuel mixing device for an annular combustion chamber of a turbojet engine, which is of reduced axial volume whilst permitting good feeding of air to the air intake orifices arranged in the bowl of the device.

For this purpose, the invention proposes a fuel mixing device for annular combustion chamber of an aircraft turbine engine which comprises, centered on a longitudinal axis of this device, a centering member centering a turbine engine injector head, at least one air intake ring comprising blades to swirl air around the longitudinal axis, a bowl provided with an annular row of air intake orifices, and an annular cavity communicating with the air intake orifices of the bowl.

According to the invention, the device comprises channels arranged through the aforementioned blades, to feed air to the annular cavity communicating with the air intake orifices of the bowl.

The channels arranged through the blades of the air intake ring allow air to be fed to the annular cavity communicating with the air intake orifices of the bowl, and thereby avoid having recourse to an annular opening as in devices of known type. A combination of channels of the type described above with an annular opening remains possible however in the invention, when this is of advantage.

In general, the invention therefore allows the designing of mixing devices which are less voluminous axially and/or radially.

The invention particularly allows the injector head carried by said device, and the air intake ring of this device, to be brought closer to the downstream end of the device i.e. the outlet thereof.

In one preferred embodiment of the invention, each of the channels of the blades of the air intake ring is aligned with a corresponding orifice arranged in an annular wall delimiting downstream the air intake ring and delimiting upstream the said annular cavity.

In this manner, the channels of the blades of the air intake ring open downstream into the annular cavity through the annular wall delimiting downstream the air intake ring. This wall generally extends parallel to the radial direction.

In addition, the annular wall delimiting downstream the air intake ring advantageously comprises a cylindrical bushing surface mounted on an upstream part forming a sleeve of the bowl.

The aforementioned annular wall therefore allows the assembly formed by the injector head centering member and the air intake ring, to be secured to the bowl.

In the preferred embodiment of the invention, the bowl comprises an annular part located radially on the outside relative to the air intake orifices of this bowl and connected to an annular wall supporting an indexing lug projecting radially outwards and intended for mounting of the device in an annular end wall of a combustion chamber, the aforementioned supporting annular wall extending towards upstream from the bowl and being sealingly connected to the annular wall delimiting downstream the air intake ring.

In this manner, the annular cavity is closed by the aforementioned annular supporting wall and by the annular wall delimiting downstream the air intake ring. This cavity is thus devoid of an annular opening, but can be fed with air via the channels of the blades of the air intake ring.

With this configuration it is possible to obtain best reducing of the axial and/or radial span of the mixing device.

Preferably, the aforementioned supporting annular wall comprises an annular thick part in which inner air ducting channels are arranged which open opposite a heat shield collar forming the radially outer end of the bowl.

The aforementioned inner channels allow the diffusing of a cooling air flow over the heat shield collar, the flow preferably being taken from upstream of the device.

In the preferred embodiment of the invention, each of the channels of the blades of the air intake ring is aligned with a corresponding orifice arranged in an annular wall delimiting upstream the air intake ring and secured to the injector head centering member.

The channels of the blades of the air intake ring therefore pass through this air intake ring from the upstream end as far as the downstream end thereof.

Advantageously, the air intake ring is divided into two annular parts by a separating member, the blades of this air intake ring extending either side thereof.

This characteristic, known as such, allows the defining in the air intake ring of a first annular air passage opening around the injector head in the vicinity thereof, and a second annular air passage extending and opening downstream of the first passage.

In manner known per se, the aforementioned separating member preferably comprises a radially inner part with an inner profile of convergent-divergent type intended, via venturi effect, to suction the fuel sprayed by the head of an injector carried by the device, this separating member on this account sometimes being called a <<Venturi>>.

The separating member is preferably made in a single piece with the blades of the air intake ring.

The invention also concerns an annular combustion chamber for turbine engine equipped with a plurality of mixing devices of the above-described type.

The invention further concerns a turbine engine comprising an annular combustion chamber of the above-described type.

BRIEF DESCRIPTION OF THE DRAWINGS

The invention will be better understood and other details, advantages and characteristics thereof will become apparent on reading the following description given as a non-limiting example with reference to the appended drawings in which.

In all these figures, identical references may designate identical or similar parts.

DETAILED DESCRIPTION OF PREFERRED EMBODIMENTS

Figure 1:
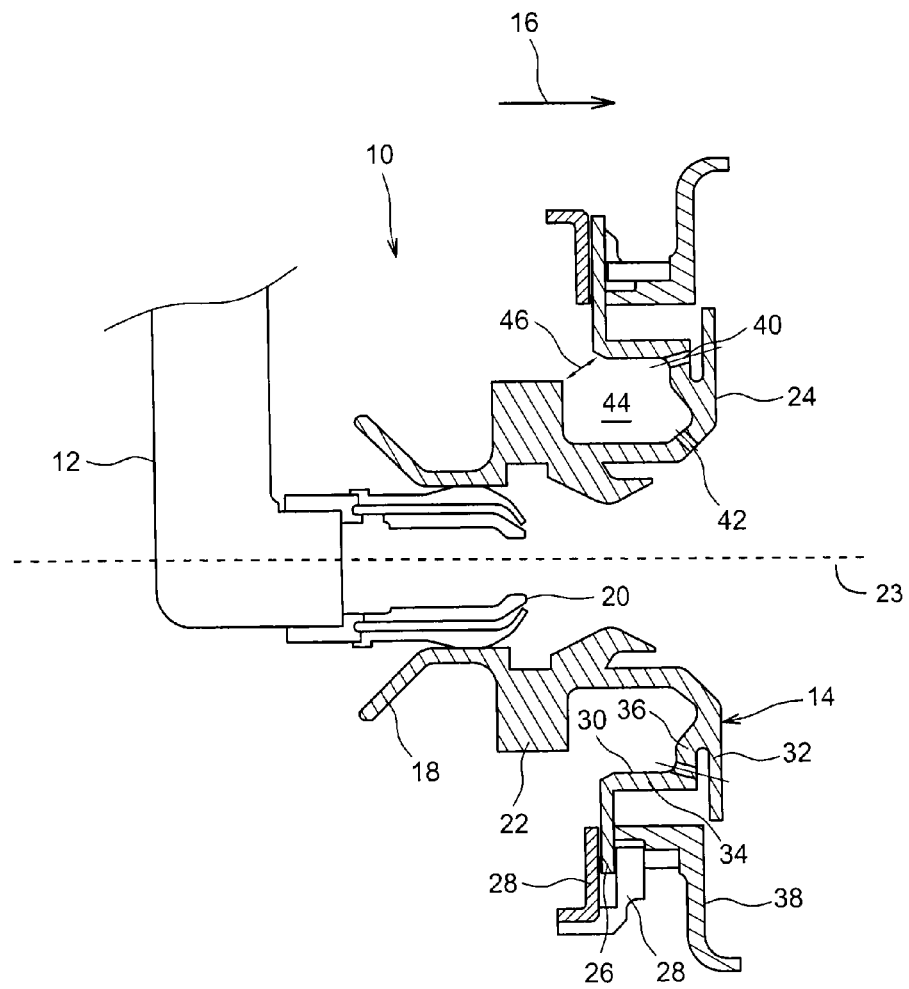
FIG. 1, already described, is a partial, schematic, axial-sectional view of an injection system for turbine engine combustion chamber of known type.
Figure 2:
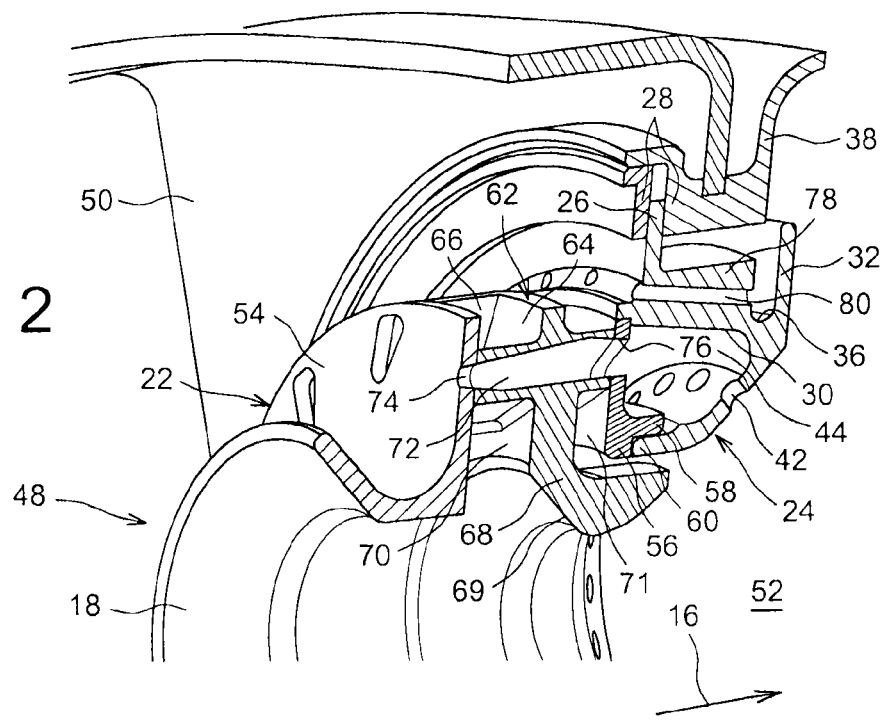
FIG. 2 is a partial, schematic, perspective view with axial section of a mixing device according to one preferred embodiment of the invention, equipping the end wall of a turbine engine combustion chamber.

FIG. 2 illustrates a fuel mixing device 48 mounted in the annular end wall 50 of a combustion chamber 52 of an aircraft turbine engine, such as an aircraft turbojet engine for example.

The air intake ring 22 of this device 48 is delimited upstream by a radial annular wall 54 formed at the downstream end of the centering member 18, and delimited downstream by a radial annular wall 56 sometimes called a <<cup>>. This cup comprises a cylindrical bushing surface of revolution 58 fixed to an end part 60 forming a sleeve of the bowl 24.

Figure 3:
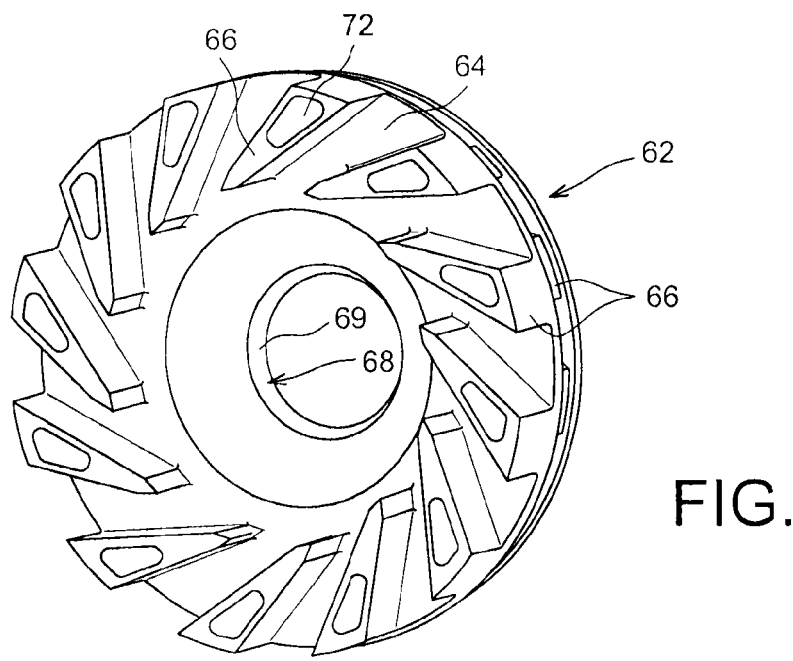
FIG. 3 is a schematic, perspective view of an air intake ring of the device in FIG. 2, shown separate from this device.

The air intake ring 22 is divided into two parts by a separating member 62 shown separately in FIG. 3.

The separating member 62 is formed of a wall having a radially outer part 64 which extends radially and which integrates the blades 66 of the air intake ring 22, said blades extending either side of the said wall.

The wall forming the separating member 62 also has a radially inner part 68 with an inner profile 69 of convergent-divergent type.

The separating member 62 allows the defining in the air intake ring 22 of a first annular air passage 70, upstream, and a second annular air passage 71, downstream (FIG. 2).

Each blade 66 of the air intake ring 22 is crossed by a channel 72 which is arranged in the said blade and which extends substantially in the axial direction, facing a corresponding orifice 74 of the radial annular wall 54 delimiting upstream the air intake ring 22, and facing a corresponding orifice 76 of the radial annular wall 56 delimiting downstream the said air intake ring 22.

The channels 72 of the blades 66 of the air intake ring 22 open downstream into the annular cavity 44 delimited by the bowl 24, by the annular wall 30 supporting the indexing lug 26 and by the radial annular wall 56 delimiting downstream the air intake ring 22.

The annular wall 30 supporting the indexing lug 26 is sealingly fixed at its upstream end to the radially outer end of the radial annular wall 56 delimiting downstream the air intake ring 22, so that the annular cavity 44 is closed and communicates upstream with the outside of the combustion chamber only through the channels 72 arranged in the blades 66 of the air intake ring 22.

In addition, the annular wall 30 supporting the indexing lug 26 comprises an annular thick part 78 in which inner air ducting channels 80 are arranged which, at their upstream end, open onto the outside of the mixing device 48 and at their downstream end they open facing the radially outer part 32 of the bowl 24 which forms the heat shield collar.

When in operation, a fuel injector head (not illustrated in FIGS. 2 and 3) is inserted in the centering member 18 and sprays fuel in the form of fine droplets towards downstream.

A flow of air enters upstream into the device 48 passing through the first annular passage 70 of the air intake ring 22 whose blades 66 cause swirling of this air flow.

The aforementioned air flow then mixes with the fuel derived from the injector.

Part of the fuel is driven towards downstream under venturi effect flowing along the inner profile 69 of the separating member 62 and is sprayed at the downstream end of this inner profile 69.

Another air flow enters downstream into the device passing through the second annular passage 71 of the air intake ring 22, whose blades 66 also cause swirling of this air flow.

The aforementioned air flow is then guided towards downstream by the inner part 68 of the separating member 62.

In addition, air enters into the channels 72 arranged in the blades 66 to feed the annular cavity then the combustion chamber 52 via the air intake orifices 42 of the bowl 24.

In addition, an air flow also flows from upstream to downstream in the channels 80 of the annular wall 30 supporting the indexing lug 26.

This air flow allows the venting and cooling of the radially outer part 32 of the bowl 24, which protects the device against radiating heat derived from the inside of the combustion chamber 52.

From a general viewpoint, the device 48 is of reduced axial volume due to the fact that the air intake ring 22 is drawn closer to the annular wall 30 supporting the indexing lug 26 and secured to the bowl 24, which is made possible by the invention.

The invention claimed is:

1. A fuel mixing device for an annular combustion chamber of an aircraft turbine engine, comprising from an upstream side of the fuel mixing device towards a downstream side of the fuel mixing device with respect to a fuel flow general direction, centered on a longitudinal axis of the fuel mixing device parallel to the fuel flow general direction:
   a centering member for centering a turbine engine injector head;
   at least one air intake ring comprising a plurality of blades swirling air around the longitudinal axis, the at least one air intake ring connected to the centering member;
   a bowl formed of a first annular wall flared radially outward from the longitudinal axis towards downstream, the bowl arranged downstream from the air intake ring, the bowl including an annular row of air intake orifices located in the first annular wall, an upstream part of the first annular wall sealingly joined to a second annular wall of the air intake ring, a downstream part of the first annular wall connected to an annular part located radially outside the annular row of air intake orifices, the annular part connected with an annular supporting wall, the annular supporting wall extending upstream from the downstream part of the first annular wall, the annular supporting wall sealingly joined to the second annular wall to enclose an annular cavity between the second annular wall, the bowl, and the annular supporting wall, the annular cavity communicating with the air intake orifices; and
   a channel arranged through each one of the plurality of blades, the channel feeding air to the annular cavity.

2. The device according to claim 1, wherein each of the channels of the plurality of blades is aligned with a corresponding orifice arranged in the second annular wall, the second annular wall delimiting a downstream end of the air intake ring and delimiting an upstream end of the annular cavity.

3. The device according to claim 2, wherein the second annular wall further comprises a cylindrical bushing surface mounted to the upstream part of the first annular wall, the upstream part forming a longitudinal sleeve of the bowl.

4. The device according to claim 2, wherein the bowl further comprises an indexing lug projecting radially outwardly from the annular supporting wall, the indexing lug for mounting the fuel mixing device in an annular end wall of the annular combustion chamber.

5. The device according to claim 4, wherein the annular supporting wall comprises an annular thick part in which longitudinal inner air ducts are arranged, the longitudinal inner air ducts opening opposite a heat shield collar forming a radially extending downstream outer end of the bowl.

6. The device according to claim 1, wherein each of the channels of the plurality of blades is aligned with a corresponding orifice arranged in a fourth annular wall delimiting an upstream end of the air intake ring, the fourth annular wall secured to the centering member for the injector head.

7. The device according to claim 1, wherein the air intake ring is divided into a first annular air passage on the upstream side of the fuel mixing device and a second annular air passage on the downstream side of the fuel mixing device by a separating member, the plurality of blades of the air intake ring extending in the first and second annular air passages.

8. An annular combustion chamber for an aircraft turbine engine, comprising:
   a plurality of fuel mixing devices, each one of the plurality of fuel mixing devices comprising from an upstream side of the fuel mixing device towards a downstream side of the fuel mixing device with respect to a fuel flow general direction, centered on a longitudinal axis of the fuel mixing device parallel to the fuel flow general direction:
   a centering member for centering a turbine engine injector head;
   at least one air intake ring comprising a plurality of blades swirling air around the longitudinal axis, the at least one air intake ring connected to the centering member;
   a bowl formed of a first annular wall flared radially outward from the longitudinal axis towards downstream, the bowl arranged downstream from the air intake ring, the bowl including an annular row of air intake orifices located in the first annular wall, an upstream part of the first annular wall sealingly joined to a second annular wall of the air intake ring, a downstream part of the first annular wall connected to an annular part located radially outside the annular row of air intake orifices, the annular part connected with an annular supporting wall, the annular supporting wall extending upstream from the downstream part of the first annular wall, the annular supporting wall sealingly joined to the second annular wall to enclose an annular cavity between the second annular wall, the bowl, and the annular supporting wall, the annular cavity communicating with the air intake orifices; and
   a channel arranged through each one of the plurality of blades, the channel feeding air to the annular cavity.

9. A turbine engine, comprising an annular combustion chamber for an aircraft turbine engine, comprising:
   a plurality of fuel mixing devices, each one of the plurality of fuel mixing devices comprising from an upstream side of the fuel mixing device towards a downstream side of the fuel mixing device with respect to a fuel flow general direction, centered on a longitudinal axis of the fuel mixing device parallel to the fuel flow general direction:
- a centering member for centering a turbine engine injector head;
- at least one air intake ring comprising a plurality of blades swirling air around the longitudinal axis, the at least one air intake ring connected to the centering member;
- a bowl formed of a first annular wall flared radially outward from the longitudinal axis towards downstream, the bowl arranged downstream from the air intake ring, the bowl including an annular row of air intake orifices located in the first annular wall, an upstream part of the first annular wall sealingly joined to a second annular wall of the air intake ring, a downstream part of the first annular wall connected to an annular part located radially outside the annular row of air intake orifices, the annular part connected with an annular supporting wall, the annular supporting wall extending upstream from the downstream part of the first annular wall, the annular supporting wall sealingly joined to the second annular wall to enclose an annular cavity between the second annular wall, the bowl, and the annular supporting wall, the annular cavity communicating with the air intake orifices; and
- a channel arranged through each one of the plurality of blades, the channel feeding air to the annular cavity.

* * * * *